(12) United States Patent
Hsu (10) Patent No.: US 7,425,070 B2
(45) Date of Patent: Sep. 16, 2008

(54) THREE-DIMENSIONAL (3D) IMAGE PROJECTION

(75) Inventor: Feng-Hsiung Hsu, Cupertino, CA (US)

(73) Assignee: Microsoft Corporation, Redmond, WA (US)

(*) Notice: Subject to any disclaimer, the term of this patent is extended or adjusted under 35 U.S.C. 154(b) by 146 days.

(21) Appl. No.: 11/128,678

(22) Filed: May 13, 2005

(65) Prior Publication Data

US 2006/0256302 A1    Nov. 16, 2006

(51) Int. Cl.
    *G03B 21/14* (2006.01)
(52) U.S. Cl. .......................... 353/7; 359/458; 359/472; 353/94
(58) Field of Classification Search .............. 353/7–9, 353/38, 94, 710; 348/42, 49, 50–52; 359/23, 359/462, 376–378, 464, 466, 472, 475, 478; 396/324; 352/43, 57, 29, 59
    See application file for complete search history.

(56) References Cited

U.S. PATENT DOCUMENTS

| | | | | |
|---|---|---|---|---|
| 3,814,513 A | * | 6/1974 | Nims et al. | 353/7 |
| 5,825,540 A | * | 10/1998 | Gold et al. | 359/462 |
| 5,855,425 A | * | 1/1999 | Hamagishi | 353/7 |
| 5,993,003 A | * | 11/1999 | McLaughlin | 353/7 |
| 6,224,214 B1 | * | 5/2001 | Martin et al. | 353/7 |
| 6,540,363 B1 | * | 4/2003 | Steffensmeier | 353/31 |
| 6,877,857 B2 | * | 4/2005 | Perlin | 353/7 |
| 6,999,071 B2 | * | 2/2006 | Balogh | 345/419 |
| 7,150,531 B2 | * | 12/2006 | Toeppen | 353/7 |
| 7,261,417 B2 | * | 8/2007 | Cho et al. | 353/10 |
| 2002/0135673 A1 | * | 9/2002 | Favalora et al. | 348/42 |
| 2004/0165265 A1 | * | 8/2004 | Harris | 359/464 |
| 2005/0088629 A1 | * | 4/2005 | Greenberg et al. | 353/94 |
| 2005/0213182 A1 | * | 9/2005 | Cossairt et al. | 359/244 |

* cited by examiner

*Primary Examiner*—William C. Dowling
(74) *Attorney, Agent, or Firm*—Lee & Hayes, PLLC (57) ABSTRACT

Three dimensional (3D) image projection is described. In one aspect, each projector of multiple projectors generate a respective composite of an image. With respect to any particular projector, the projector's corresponding composite image encapsulates multiple vertical slices of the image. Each vertical slice in the composite image represents a particular portion of the image for projection by the projector onto a specific area of multiple areas on a screen. The size of the specific area is a function of a width of a viewpoint of multiple viewpoints, wherein the viewpoint is linearly positioned with the specific area on the screen and the projector.

18 Claims, 10 Drawing Sheets

Front Projection Screen
100

Overhead View of a Full Parallax Display System

Fig. 10

Front View of a Full Parallax Projection System

THREE-DIMENSIONAL (3D) IMAGE PROJECTION

BACKGROUND

Traditional three dimensional (3D) projection systems use lenticular screens to separate the views for the eyes. 3D projection is typically the only reasonable and low cost means to produce large area/volume 3D displays. However, conventional systems and techniques for 3D projection cannot handle large number of views. This is because lenticular screen precision and the interlayer registration requirements to present 3D images are excessive and substantially burdensome.

SUMMARY

Three dimensional (3D) image projection is described. In one aspect, each projector of multiple projectors generate a respective composite of an image. With respect to any particular projector, the projector's corresponding composite image encapsulates multiple vertical slices of the image. Each vertical slice in the composite image represents a particular portion of the image for projection by the projector onto a specific area of multiple areas on a screen. The size of the specific area is a function of a width of a viewpoint of multiple viewpoints, wherein the viewpoint is linearly positioned with the specific area on the screen and the projector.

BRIEF DESCRIPTION OF THE DRAWINGS

In the Figures, the left-most digit of a component reference number identifies the particular Figure in which the component first appears.

FIG. 6 shows an exemplary system providing rear-projection for 3D image display. More particularly, FIG. 6 shows exemplary relationships between an image projected onto a screen and multiple possible viewpoints of that image.

FIG. 7 shows an exemplary system providing rear-projection for 3D displays. More particularly, FIG. 7 shows the particular vertical slices of one or more images produced by an array of multiple projectors.

FIG. 9 shows an exemplary overhead view of a full-parallax 3D display.

FIG. 10 shows an exemplary frontal view of a full-parallax 3D display.

DETAILED DESCRIPTION

Overview

Lenticular screens have been used to generate 3D images for about a hundred years. Lenticular screens can be used to generate stationary 3D images, for example, on the cover of a book, or lenticular screens can be used in combination with electronic displays to generate dynamic 3D images. In the case of 3D LCD displays, the LCD pixels are right at the focus plane of the (vertical) cylindrical lenses of the lenticular screens. This means the light from each point on the LCD will only go into a specific horizontal viewing direction. If there are two pixel columns behind each cylindrical lens, then the 3D LCD display presents two different views, one for each eye, at halved horizontal resolution.

For 3D projection displays (i.e., non-LCD screens), the lenticular screen, or lenticular sheet, acts somewhat differently. A lenticular screen serves the function of recasting the reflected (transmitted) light toward the same direction of the projector (or the mirror image of the projector). This function is needed if each eye is to see an exact image projected by one of the projectors.

Figure 1:
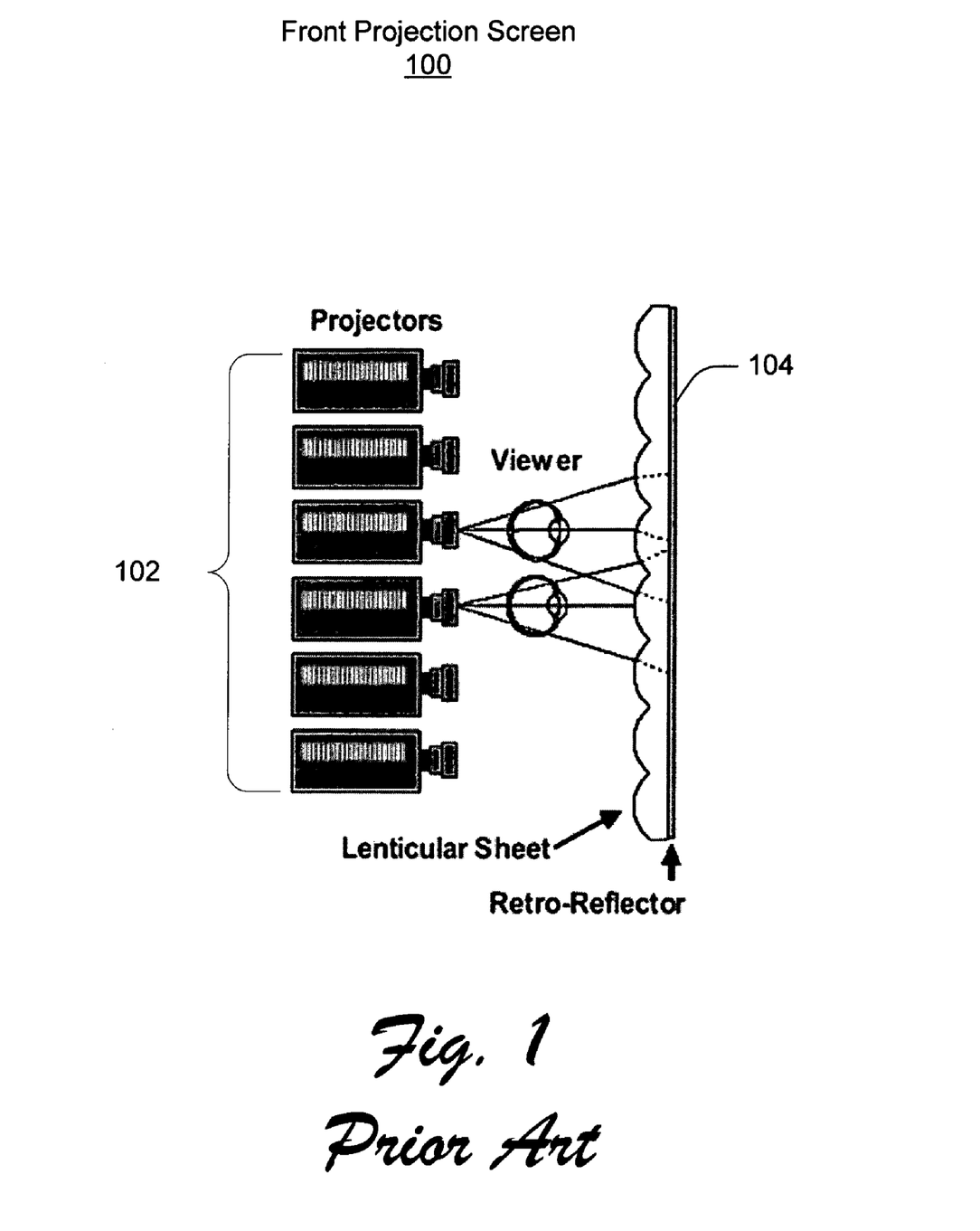
FIG. 1 illustrates an exemplary system providing 3D image projection.

FIG. 1, for example shows a set of projectors 102 for front-projection of a 3D display on a lenticular screen 104, or "retro-reflector". In this example, and instead of an LCD, a reflector 104 is positioned at the focus plane of the cylindrical lenses associated with projectors 102. The reflector has some level of diffusing power in the vertical direction. Each projector 102 is focused on the lenticular screen. Each projector 102 projects from a horizontal position that is unique as compared to projections from each of the other projectors 102. Each projector's cylindrical lens first focuses light onto the reflector. Since the reflector is on the focus plane, when the reflected light goes through the cylindrical lenses, the reflected light returns in the same horizontal direction as its origin (i.e., to the very projector 102 providing the light. Thus, if projectors 102 number 16, then theoretically, a 3D display with 16 different angular views is generated.

Figure 2:
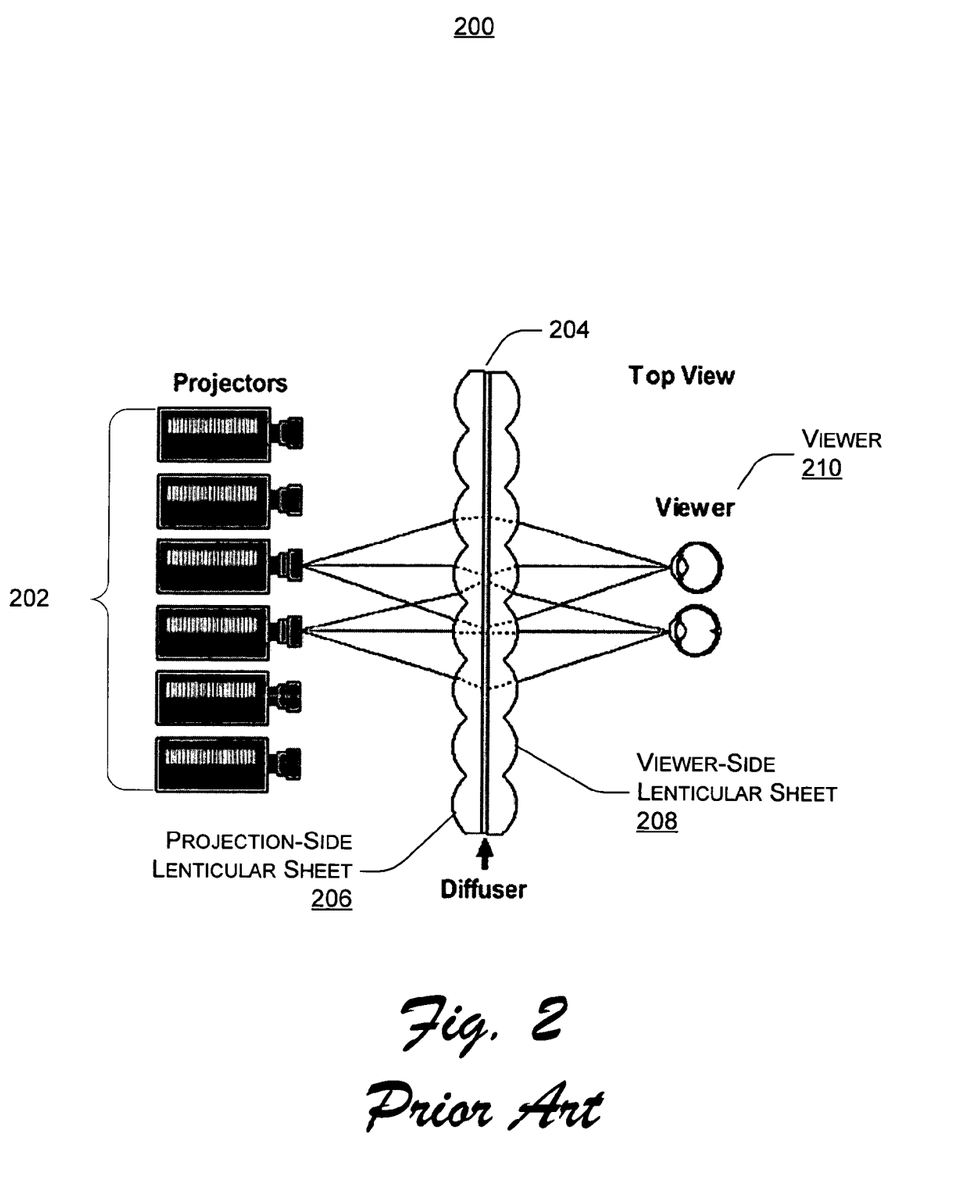
FIG. 2 shows an exemplary system for rear-projection of a 3D display on a rear-projection screen.

FIG. 2 shows a set of projectors 202 for rear-projection of a 3D display on a rear-projection screen 204. In this example, the rear projection screen 204 is generated from two perfectly aligned identical lenticular sheets 206 and 208. Lenticular sheets 206 and 208 are cemented together such that a cement plane ("diffuser") coincides with the focus planes of cylindrical lenses (from projectors 202 and a viewer 210) on either side of screen 204.

The main difficulty with the existing 3D projection schemes lie with the use of the lenticular sheet in the optical setup. These projection schemes implement multi-view systems, where each projector provides one single view, which is seen in total from a particular viewing zone. This means that when a viewer moves from one viewing zone boundary to a different viewing zone, the viewer will either see a sudden jump from one view to another, or two overlapping images, rather than a continuously changing view. Additionally, and in the case of front projection 3D displays, for example, as shown in FIG. 1, the lenticular screens place a high precision requirement of the placement for the reflector that can be difficult to satisfy. To make matters worse, and for rear projection 3D displays, for example, as shown in FIG. 2, the additional alignment requirement for the cylindrical lenses make this implementation impractical for large number of views.

An Exemplary System

Although not required, the systems and methods providing 3D image projection are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 3:
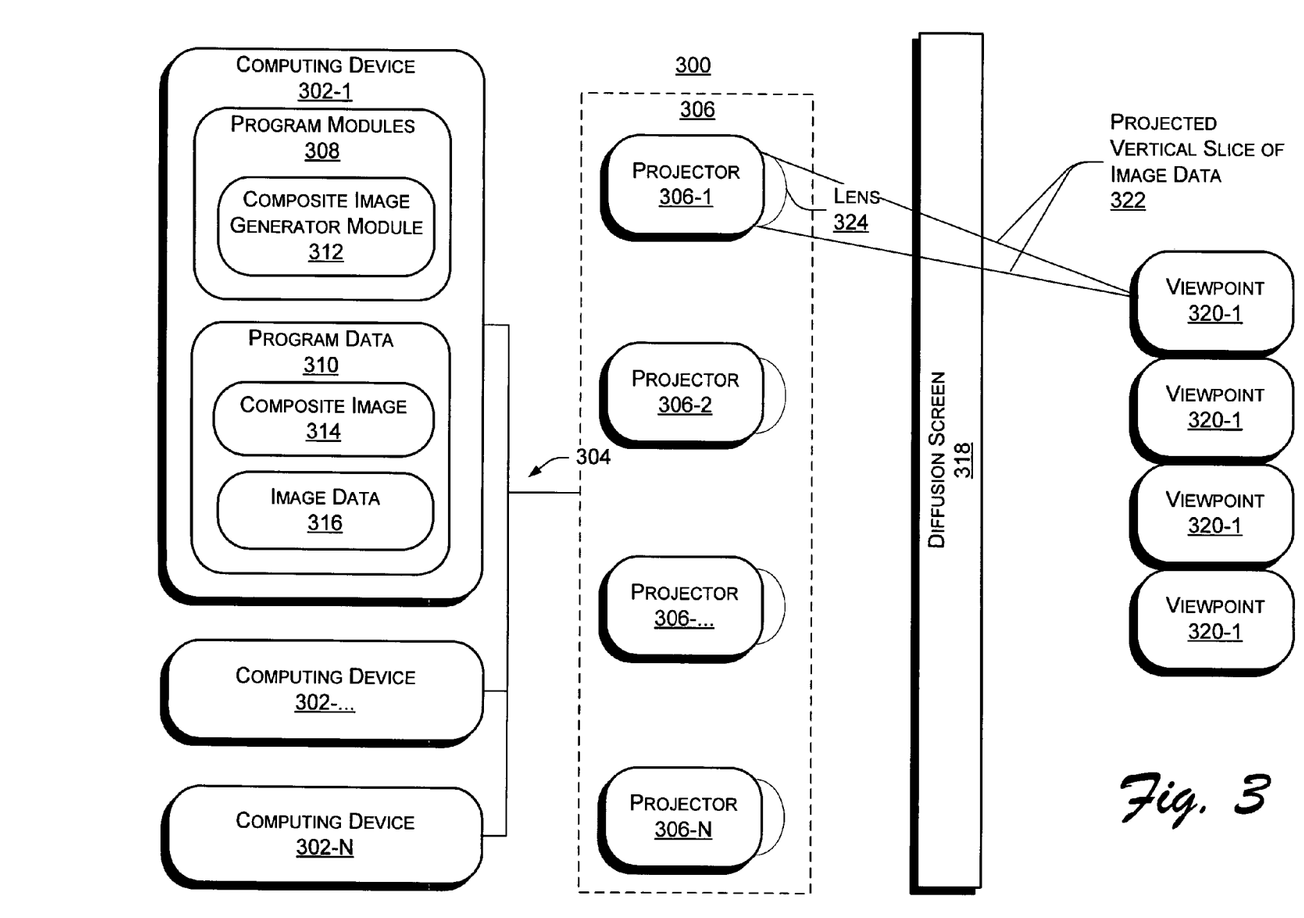
FIG. 3 shows a set of projectors for rear-projection of a 3D display on a rear-projection screen.

FIG. 3 shows an exemplary system 300 for 3D image projection. System 300 includes one or more computing devices 302 (e.g., 302-1 through 302-N) coupled over network 304 to an array of projectors 306 (e.g., projectors 306-1 through 306-N). The one or more computing devices 302 respectively represent any type of computing device such as a personal computer, a laptop, a server, and/or so on. Each computing device 302 includes one or more program modules 308 and program data 310. Program modules include, for example, composite image generator module 312 to generate one or more respective composite images 314 from digital image data 316. Each composite image 314 is generated for a particular one or more of the projectors 306 of the multiple projectors 306-1 through 306-N as a function of geometrical orientation(s) of respective ones of the one or more of the projectors 306 with a diffusing screen 318 and multiple viewpoints 320 for viewing corresponding portions of the projected composite image(s) 314.

More particularly, each composite image 314 encapsulates multiple vertical slices of image data 316. For purposes of exemplary illustration, a projected vertical slice is represented with a respective pair of lines 322 emanating from a lens 324 on a projector 306-1 towards the diffusion screen 318 for viewing at a viewpoint 320-1. Each pixel or pixel column in a vertical slice is generated to have color and intensity for viewing (assuming, for example, rear projection) in a viewing space along a line formed by the pixel (or the pixel column) and the projector 306 for which the composite image 314 was generated. As a result, each composite image 314 projected by a particular projector 306 represents portions of the image data 316 from different viewpoints as compared to composite image(s) 314 generated for different projectors 306.

Computing device 302-1 may generate respective composite images 314 for one or more of the projectors 306. If computing device 302-1 does not generate a composite for a particular projector 306, a different computing device 302 (e.g., 302-2) can generate that a respective composite image 314 for that particular projector. Accordingly, number of computing devices 302 utilized to generate composite images 314, and the particular projectors 306 for which respective ones of the computing devices 302 generate corresponding composite images 314, is arbitrary, and a function of the desired architecture of system 300.

Computing device(s) 302 communicate generated composite images 314 to corresponding ones of the projectors 306-1 through 306-N over network 304. Network 304 includes any combination of wired and/or wireless connections, a local area network (LAN), a general wide area network (WAN) communication environment, such as those that are commonplace in offices, enterprise-wide computer networks, intranets, and the Internet. Subsequent to receiving a composite image 314, a projector 306 projects the vertical slices from the composite image 314 towards diffusion screen 318 for viewing at one or more viewpoints 320.

Figure 4:
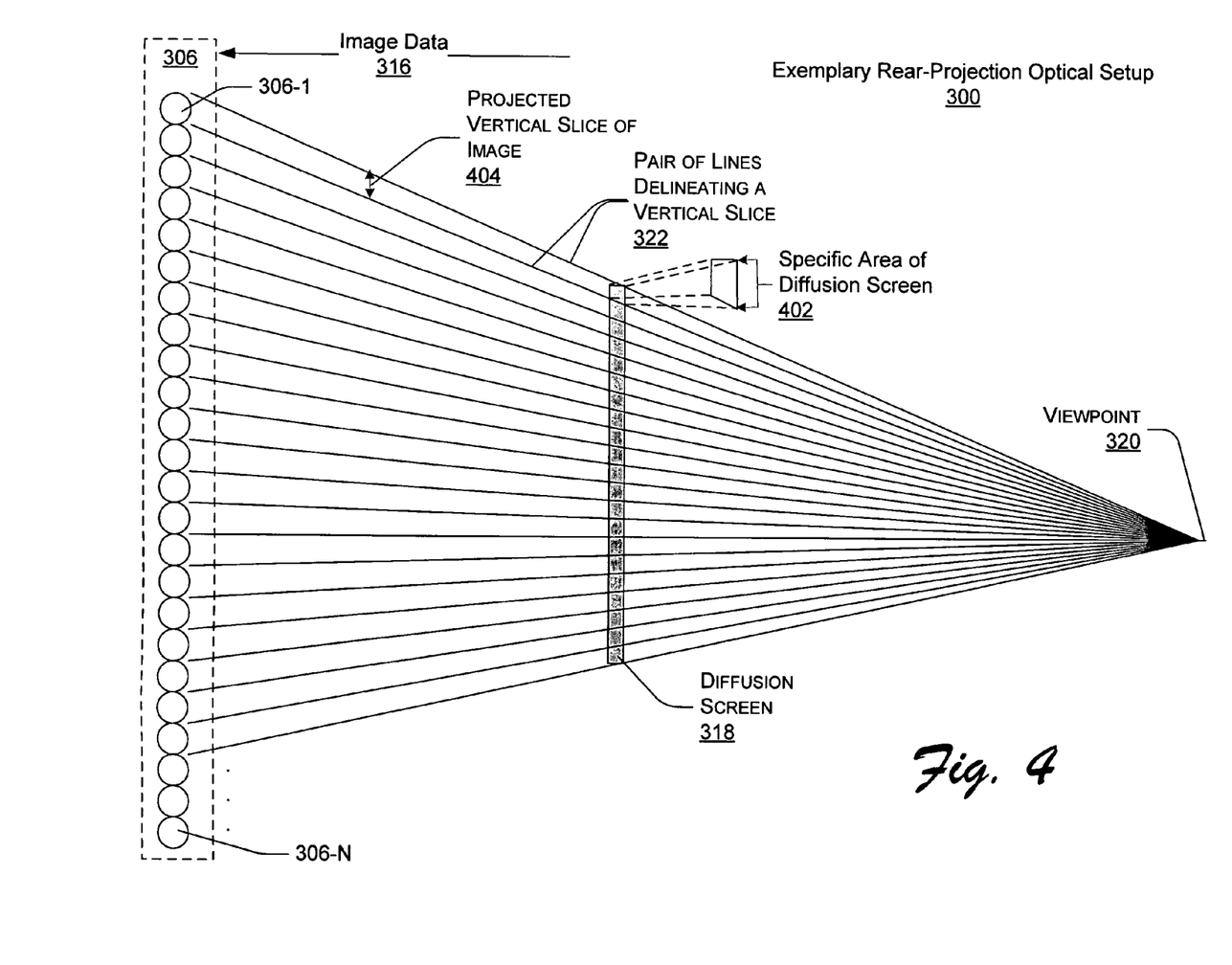
FIG. 4 shows an overhead view of an exemplary system providing 3D image projection. More particularly, the system shows an exemplary optical setup for a rear-projection horizontal-parallax-only (HPO) 3D display of an image.

FIG. 4 shows an overhead view of an exemplary system 300 providing 3D image projection. More particularly, system 300 shows an exemplary optical setup for a rear-projection horizontal-parallax-only (HPO) 3D display of image data 316. For purposes of discussion and exemplary illustration, the elements of FIG. 4 are described with respect to the elements of FIG. 3. In the Figures, the left-most digit of a component reference number identifies the particular Figure in which the component first appears.

Referring to FIG. 4, system 300 includes multiple projectors 306 (e.g., 306-1 through 306-N), diffusion screen 318, and one or more viewpoints 320. Each projector 306 projects vertical slices of a composite image 314 onto diffusion screen 318 for 3D display. In this implementation, projectors 306 are arranged into a one-dimensional horizontal array so that an eye positioned at a viewpoint 320 will see an image rendered onto diffusion screen 318 by the whole of projector array 306. Diffusion screen 318 is not a lenticular screen. Diffusion screen 318 diffuses in the vertical direction (i.e., orthogonal (in and out) to the surface of FIG. 4). Screen 318 diffuses very little, or not at all in the horizontal direction. This implementation provides for a large number of viewpoints 320 to allow simultaneous viewing by a large audience without requiring individuals to wear specialized eyewear to experience the 3D effect. Additionally, this arrangement does not have the high precision and registration requirements of conventional 3D projection systems and techniques. This also means that when the viewer moves from one viewpoint 320 to another viewpoint 320, the viewer will experience a continuously changing (not jumpy or incoherent) view.

As described above, each composite image 314 encapsulates multiple vertical slices. For purposes of exemplary illustration, each projected vertical slice is represented in FIG. 4 with a pair of adjacent lines (e.g., line pair 322) emanating from a particular projector 306 (e.g., 306-1) in a straight line to a particular viewpoint 320 of multiple possible viewpoints 320. The line pairs emphasize that each vertical slice is generated for viewing from the perspective of a specific one viewpoint 320 (e.g., eye location) of multiple different viewpoints 320. Each projector 306 (e.g., 306-1 through 306-N) projects a respective vertical slice to each specific area (e.g., specific area 402) of the multiple specific areas on the diffusion screen 318. As a result, and rather than seeing a complete image from a single projector, a viewer positioned at a viewpoint 320 will see an image rendered onto the entire diffusion screen 318 by the whole of projector array 306. Optically, this is a vastly simpler design as compared to conventional projector systems and techniques. One reason for this is because substantially onerous requirements for proper focusing and registration of lenticular screens 104 (FIG. 1) and 204 (FIG. 2) is replaced with the controlled diffusive power of screen 318.

Figure 5:
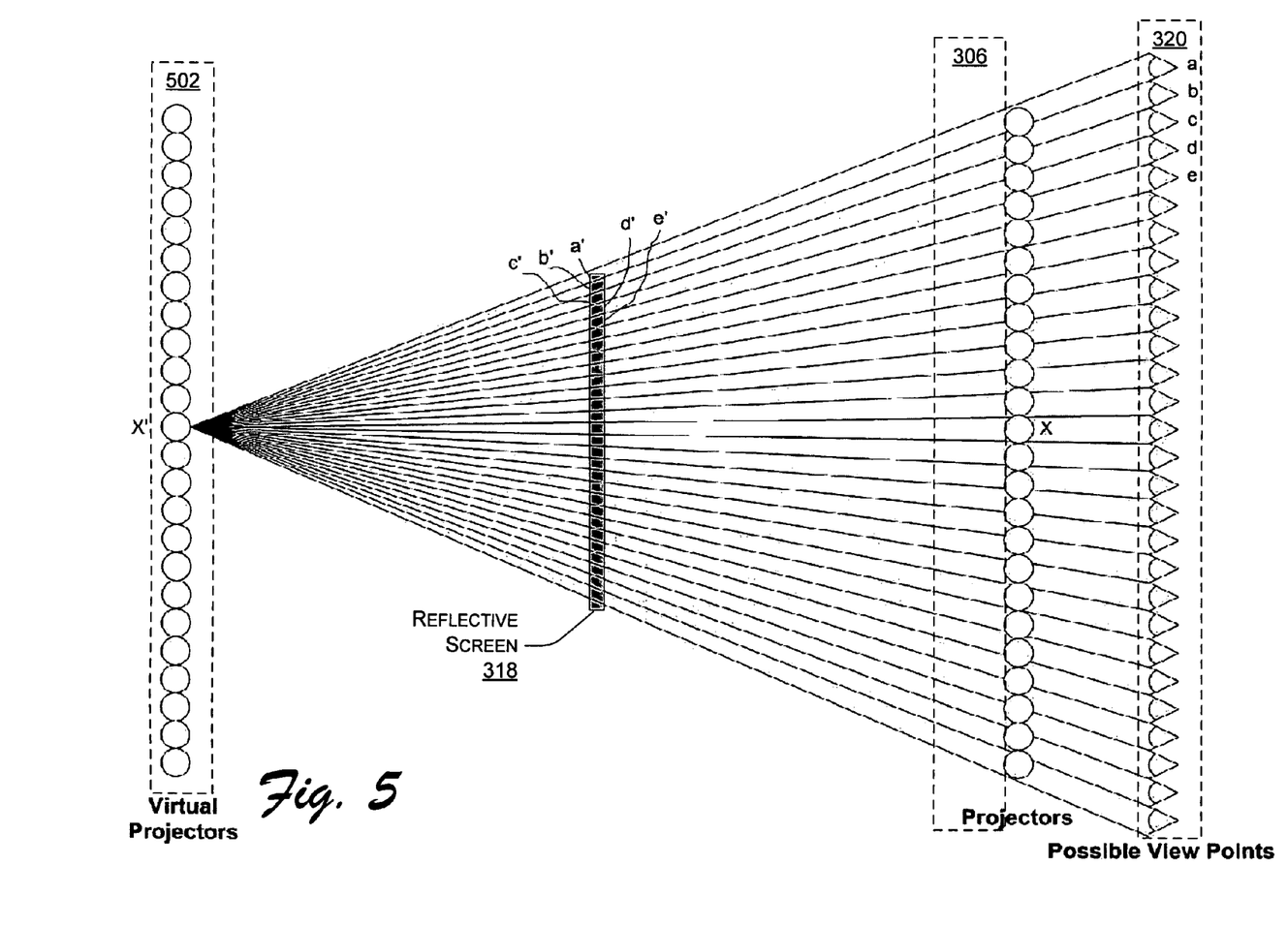
FIG. 5 shows an exemplary front projection, where projectors are placed at mirror image locations with respect to a reflective screen to provide a front-projection HPO setup (e.g., a theater setting).

FIG. 5 shows an exemplary front projection, where projectors 306 are placed at mirror image locations with respect to a reflective screen 318 to provide a front-projection HPO setup (e.g., a theater setting). In this alternate implementation, screen 318 is reflective, and diffusively reflects in the vertical direction with little or no diffusive power in the horizontal direction. Virtual projector "x" is at the mirrored location for the real projector "x" 306. The slicing relationships are the same as described with respect to the rear-projection implementations, with the exception that the virtual projectors are used to compute the slices.

Figure 6:
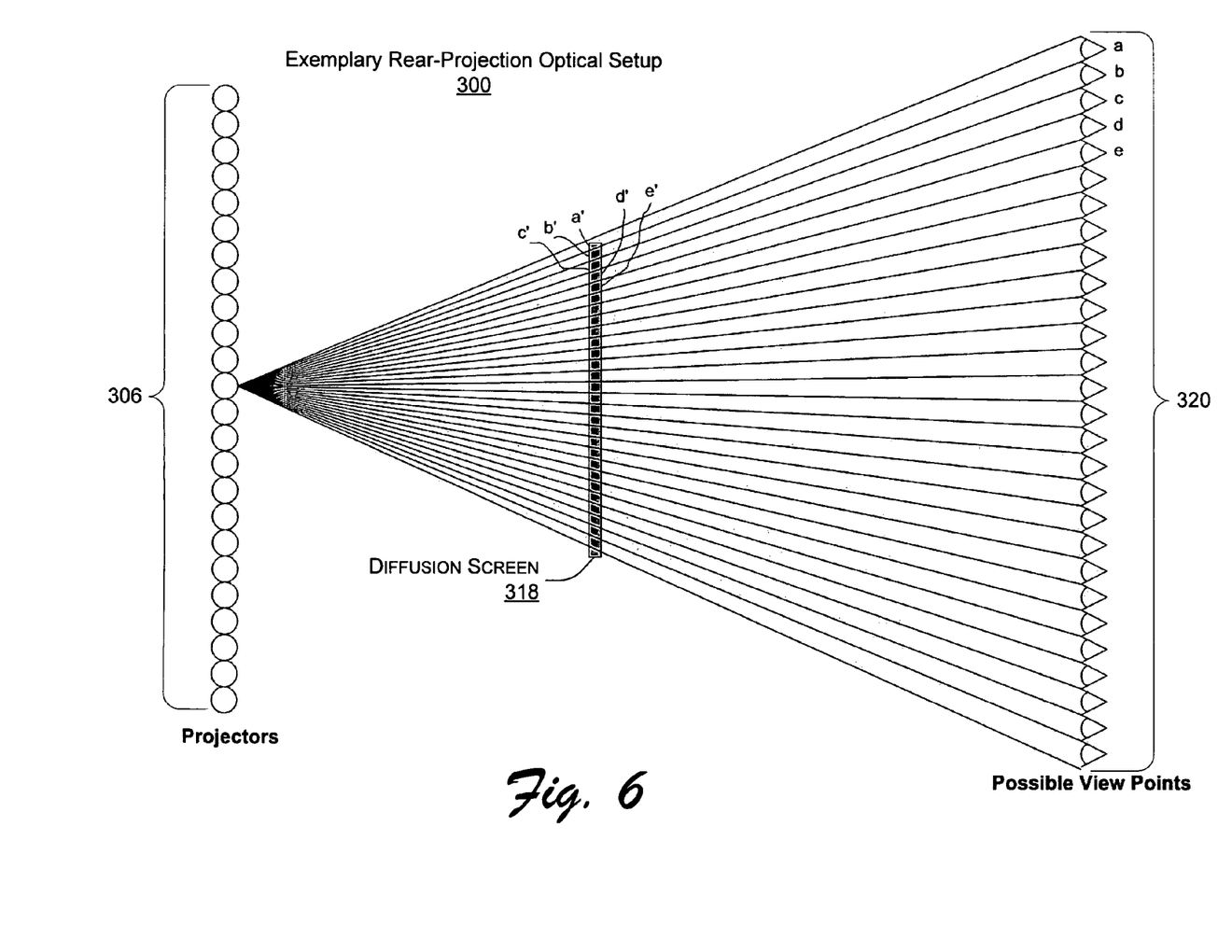

FIG. 6 shows an exemplary system 300 providing rear-projection for 3D displays. For purposes of discussion and exemplary illustration, the elements of FIG. 6 are described with respect to the elements of FIGS. 3 and 4. In the Figures, the left-most digit of a component reference number identifies the particular Figure in which the component first appears. FIG. 6 shows exemplary relationships between an image projected onto screen 318 and multiple possible viewpoints 320 of that projection. The projected image consists of multiple projected vertical image slices. Each vertical slice is represented by a pair of adjacent lines extending from a respective projector 306 to a particular viewpoint 320 (e.g., viewpoint "a"). For every pixel projected onto screen 318 by a given projector 306, the color and the light intensity of the pixel produced by the projector 306 is precisely what would be seen in the direction of the pixel by an eye positioned at a particular viewpoint 320. The particular viewpoint 320 is linearly positioned (in a straight line) with both the pixel and the projector 306 projecting the particular vertical slice.

Figure 7:
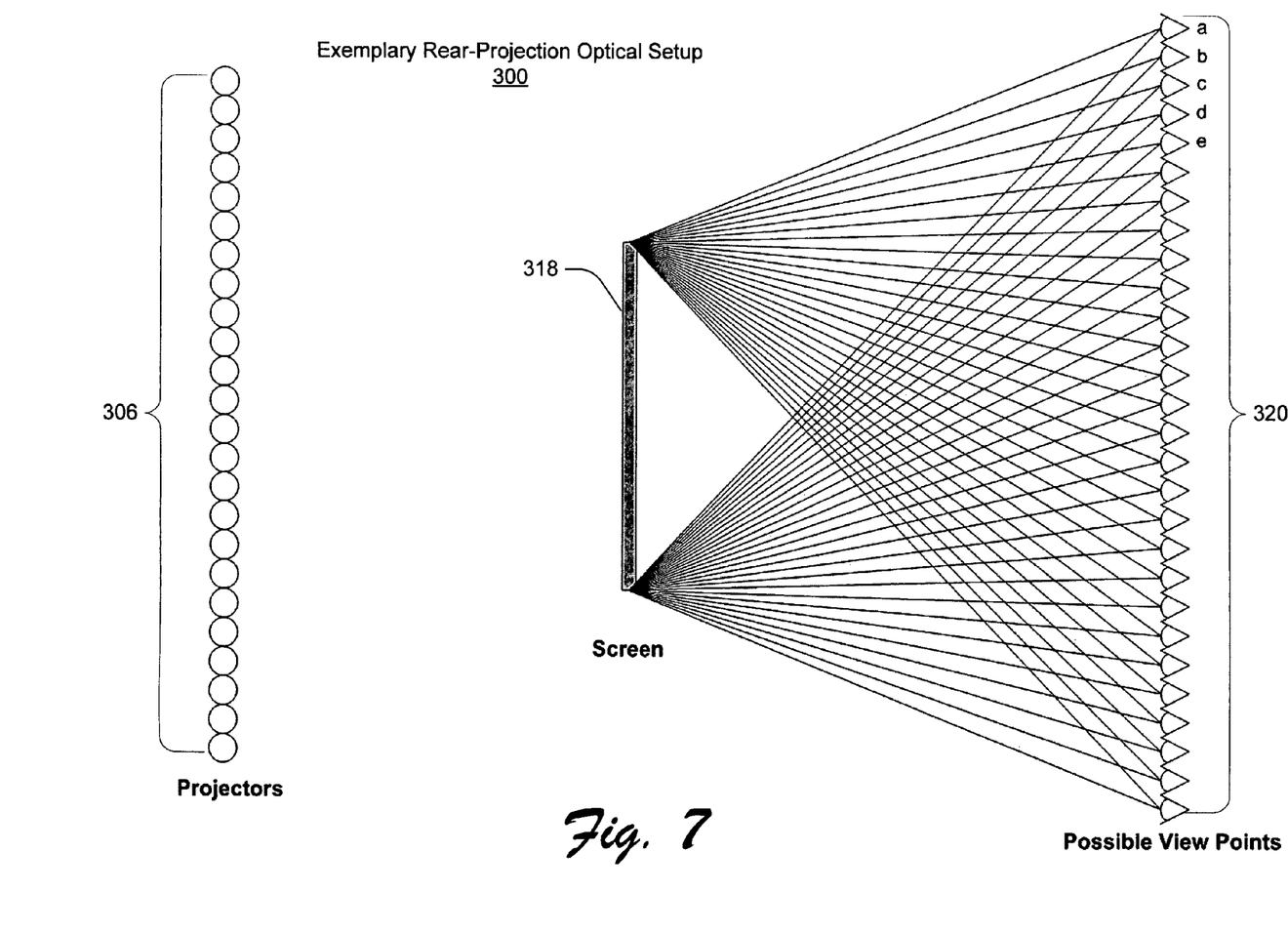

FIG. 7 shows an exemplary system 300 providing rear-projection for 3D displays. For purposes of discussion and exemplary illustration, the elements of FIG. 6 are described with respect to the elements of FIGS. 3 through 4, and 6. In the Figures, the left-most digit of a component reference number identifies the particular Figure in which the component first appears.

More particularly, FIG. 7 shows the particular vertical slices that each projector 306 of the multiple projectors 306 produce. Each viewpoint 320 represents a particular view of screen 318. In this example, viewpoints a, b, c, d, e, etc., are positioned such that different viewers positioned at respective ones of the viewpoints will each see a different view on screen 318 as compared to each other viewers. Projectors 306 produce a composite image comprised of all of the vertical slices (and/or their interpolations when the initial number of viewpoints 320 is small). Referring to FIG. 6, screen slice a' is the reverse projection of viewpoint width (e.g., a projected pupil width) on screen 318 for the corresponding projector 306. (For example, consider that a pupil is a distance x from a projector 308, the screen 318 is at a distance y from the projector 308, and the projector 308 is approximated as a point. In this scenario, the projected width is y/x times the pupil width.) Similarly, screen slices b', c', d', and e' are the corresponding reverse projections for viewpoints b, c, d, and e. Now, we can easily derive that each projector 306 produces an image that consists of vertical slice a' of view "a", vertical slice b' of view "b", etc.

An Exemplary Procedure

Figure 8:
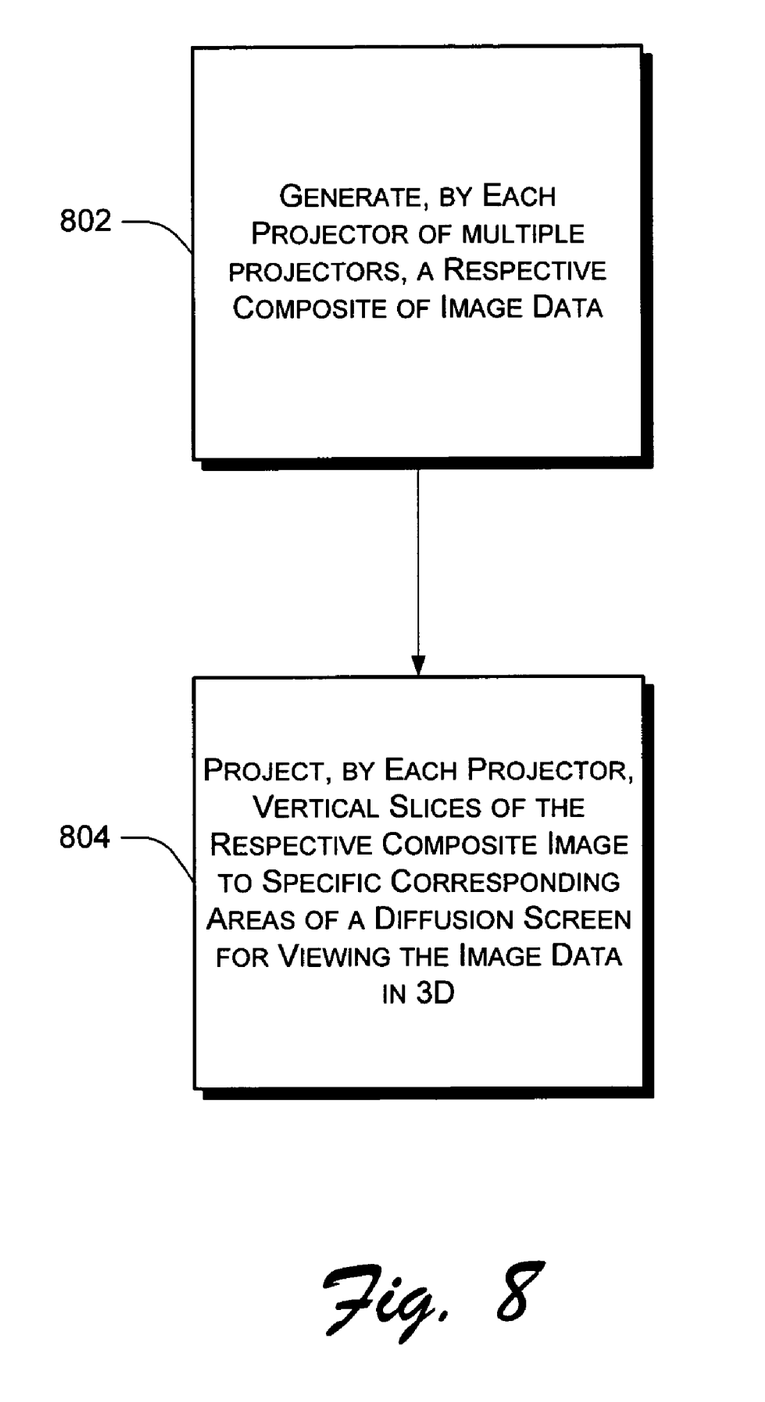
FIG. 8 shows an exemplary procedure providing 3D image projection.

FIG. 8 shows an exemplary embodiment of a procedure providing projection for 3D displays. For purposes of discussion and illustration, operations of this procedure are described with respect to components of FIGS. 3 through 6. The left-most digit of a component reference number identifies the particular figure in which the component first appears.

At block 802, each projector 306 of multiple projectors 306, generates a composite 314 of image data 316. The composite image 314 includes multiple vertical slices of the image data 316. Each vertical slice represents a respective portion of the image for projection onto a particular area 402 of multiple areas on a screen 318. The particular area 402 has a size that is a function of a width of a viewpoint 320 of multiple viewpoints. The viewpoint is in a straight line with the particular area 402 and the projector 306 that projected the vertical slice.

At block 804, each projector 306 of the multiple projectors projects a corresponding composite 314 onto the screen 318. The composites are projected such that each area 402 of the multiple areas 402 on the screen 318 presents a single vertical slice of the image data 316 from each projector 306 of the multiple projectors. Screen 318 is not a lenticular screen. The screen 318 diffuses the projected vertical slices in a vertical direction, with little or no diffusion of the projected image data in a horizontal direction.

Alternate Implementations

Figure 9:
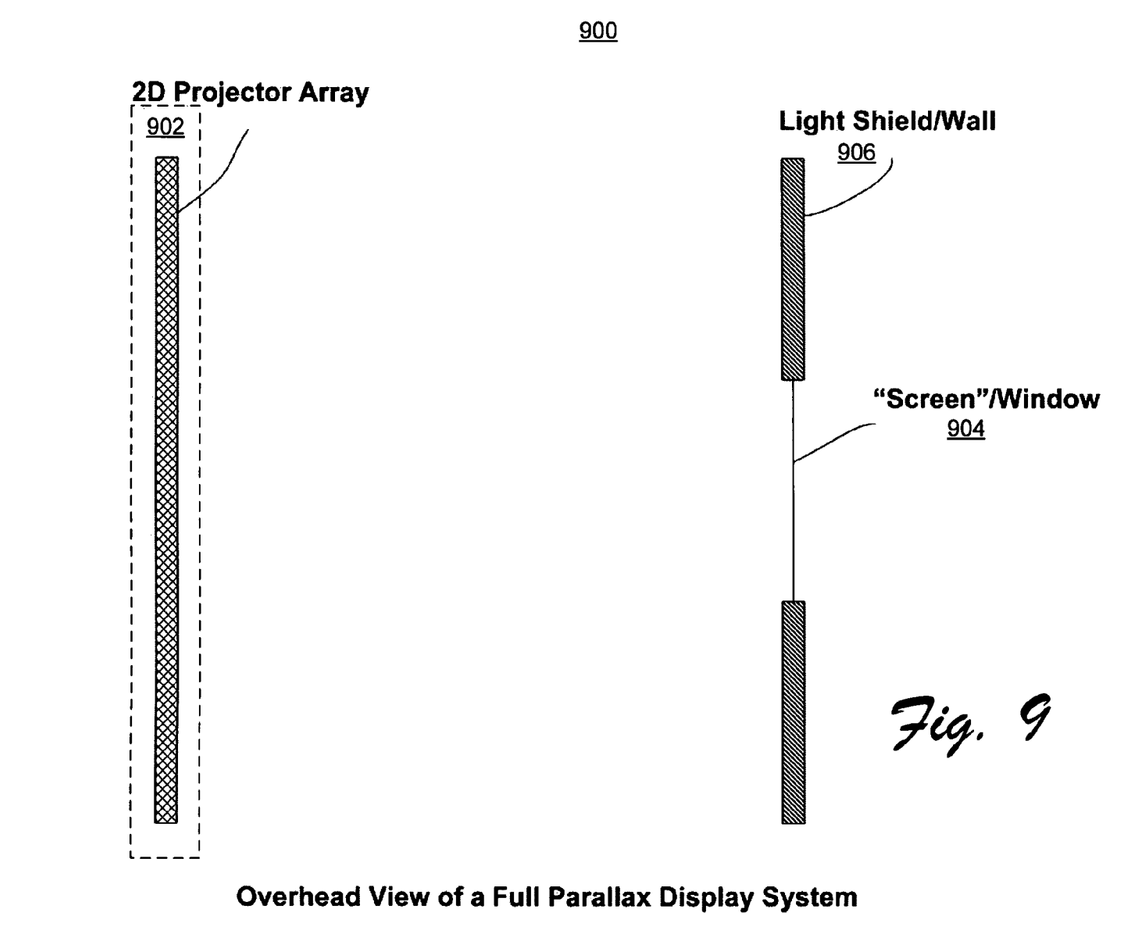
FIG. 9 shows how the exemplary projector and screen setups of FIGS. 3-7 can be extended to implement of a full-parallax 3D display. More particularly.

FIG. 9 shows how the exemplary projector and screen setups of FIGS. 3-7 can be extended to implement of a full-parallax 3D display. More particularly, FIG. 9 shows an exemplary overhead view of a full-parallax 3D display. For purposes of discussion and exemplary illustration, the components of FIG. 9 are described with respect to the elements of FIG. 3. In the Figures, the left-most digit of a component reference number identifies the particular Figure in which the component first appears.

In this alternate implementation, projector array 902 is densely packed and two-dimensional. Each projector 902 produces vertical slices of image data 316 that is a two-dimensional composite (versus the one-dimensional vertical-slice-composite for an HPO display) of intersection zones subtended by the two-dimensional possible viewpoints 320 with their respective views. Vertical diffusing power of screen/window 904 is reduced, as compared to that of a diffusing screen 318 of FIG. 3. If projectors 306 are sufficiently dense such that no diffusing power is required of screen 318, then the screen 318 becomes a virtual screen for a rear projection system. That is, screen 318 is a surface such as air or a transparent sheet upon which projectors 902 focus and project respective vertical slices of images.

Figure 10:
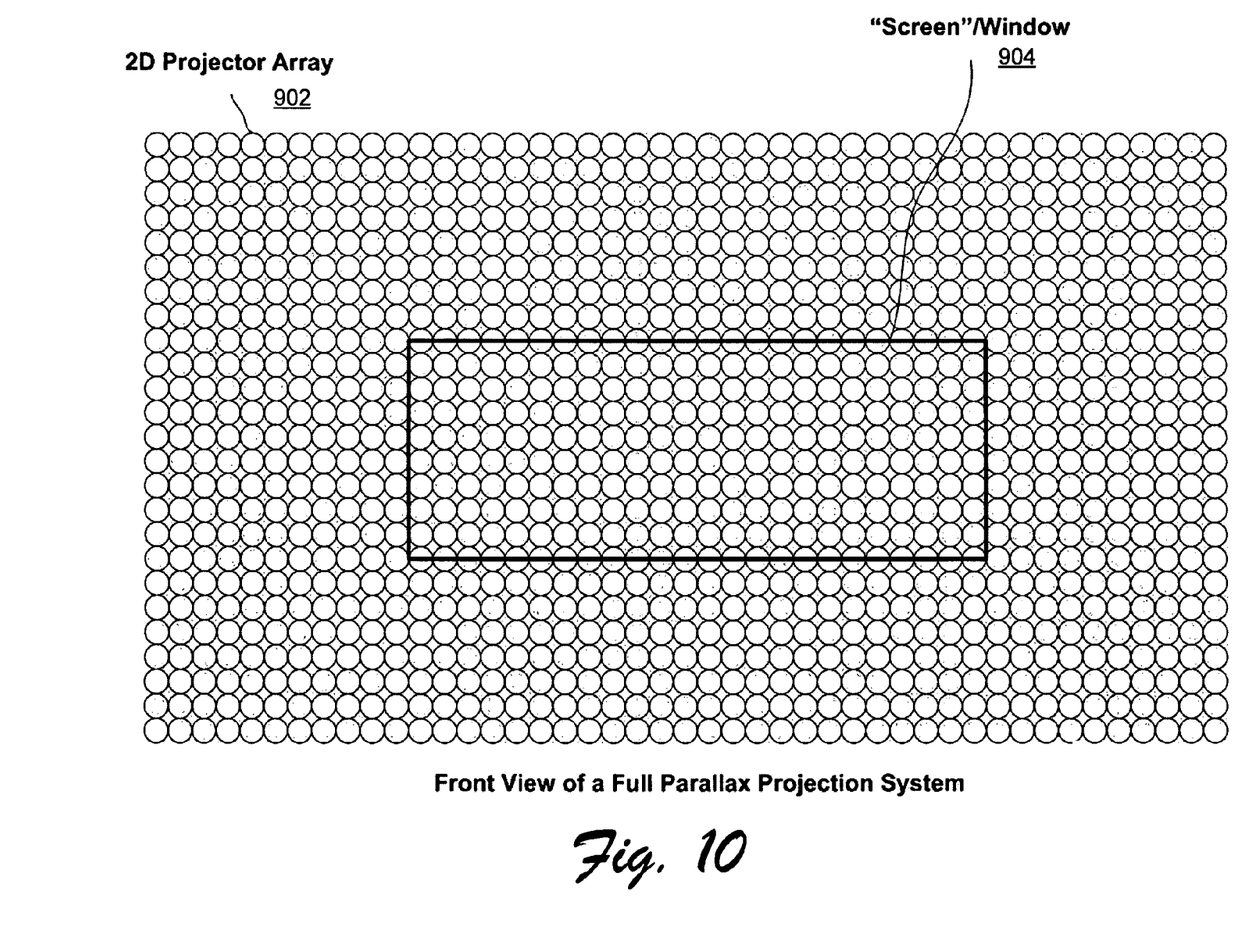
FIG. 10 shows how the exemplary projector and screen setups of FIGS. 3-7 can be extended to implement of a full-parallax 3D display. More particularly.

FIG. 10 shows how the exemplary projector and screen setups of FIGS. 3-7 can be extended to implement of a full-parallax 3D display. More particularly, FIG. 10 shows an exemplary frontal view of a full-parallax 3D display.

Conclusion

Although the systems and methods providing 3D image projection have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
arraying multiple projectors into an array;
generated multiple composite of an image wherein each composite is generating by a projectors, each composite having multiple vertical slices, wherein each vertical slice is generated for viewing from the perspective of a viewpoint having a defined width; and
projecting each vertical slice to a specified area, the specified area being linearly positioned between each projector and the viewpoint and is sized as a function of the width of the defined viewpoint, wherein the specified area is projected to a diffusion screen is reflective and diffuses a projected image in a vertical with substantially no diffusion in a horizontal direction.

2. A method as recited in claim 1, wherein the array is arranged into a one-dimensional array.

3. A method as recited in claim 1, wherein the array is arranged to project the image using front horizontal-parallax-only projection. image in a vertical direction with little or no diffusion in a horizontal direction.

4. A method as recited in claim 1, wherein the array is arranged to project the image for full-parallax 3 D display of the image.

5. A method as recited in claim 1, wherein generating the multiple composites of the image further comprises: crating each vertical slice of each composite such that color and light intensity represents what an eye will discern from the defined viewpoint when each vertical slice is projected onto the specific area.

6. A method as recited in claim 1, further comprising projecting, by each projector of the multiple projectors, the multiple composites such that each area of the multiple specified areas on the diffusion screen presents a single vertical slice of the image from each projector of the multiple projectors.

7. A computer-readable medium comprising computer-program instructions executable by a processor for:
arraying multiple projectors into an array, wherein the multiple projectors are arrayed in a one dimensional horizontal array;
generating multiple composites of an image wherein each composite is generated by a projector, each composite having multiple vertical slices, wherein each vertical slice is generated for viewing from the perspective of a viewpoint having a defined width; and
projecting each vertical slice to a specified area, wherein the specified area being linearly positioned between each projector and the viewpoint and is sized as a function of the width of the defined viewpoint, wherein the specified area is projected to a diffusion screen, wherein the diffusion screen is reflective and diffuses a projected image in a vertical direction with substantially no diffusion in a horizontal direction.

8. A computer-readable medium as recited in claim 7, wherein the diffusion screen diffuses the projected image in a vertical direction, and wherein the screen does not diffuse the projected image in a horizontal direction.

9. A computer-readable medium as recited in claim 7:
wherein the diffusion screen diffuses the projected image in a vertical direction; and
wherein the diffusion screen diffuses the projected image in the horizontal direction an amount less than an amount of image diffusion in the vertical direction.

10. A computer-readable medium as recited in claim 7, wherein generating the multiple composites of the image further comprises:
creating each vertical slice of each composite such that color and light intensity represents what an eye will discern from the defined viewpoint when each vertical slice is projected onto the specific area.

11. A computer-readable medium as recited in claim 7, wherein projecting further comprises projecting the image in 3 D with a rear projection horizontal-parallax-only display.

12. A computer-readable medium as recited in claim 7, wherein the multiple projectors are arrayed in a front horizontal parallax only projection configuration.

13. A computing device comprising:
a processor; and
a memory coupled to the processor, the memory comprising computer-program instructions executable by the processor for:
arraying multiple projectors into an array, wherein the multiple projectors are arrayed in a one dimensional horizontal array, a densely packed two dimensional array, or a front horizontal-parallax-only projection configiuration;
generating multiple composites of an image wherein each composite is generated by a projector, each composite having multiple vertical slices, wherein each vertical slice is generated for viewing from the perspective of a viewpoint having a defined width; and
projecting each vertical slice to a specified area, wherein the specified area is linearly positioned between each projector and the viewpoint and is sized as a function of the width of the defined viewpoint.

14. A computing device as recited in claim 13, wherein the specified area is projected a specified area of a diffusion screen, wherein the diffusion screen is not a lenticular screen.

15. A computing device as recited in claim 14, wherein the diffusion screen diffuses a projected image in a vertical direction with substantially no diffusion in a horizontal direction.

16. A computing device as recited in claim 13, wherein the computer-program instructions further comprise instructions for projecting, by each projector of the multiple projectors, the multiple composites onto the screen such that each area of the multiple areas on the screen presents a corresponding single vertical slice of the image from each of the multiple composites.

17. A computer-readable medium comprising computer-program instructions executable by a processor for:
arraying multiple projectors into an array wherein the multiple projectors are arrayed in a densely packed two dimensional array;
generating multiple composites of an image wherein each composite is generated by a projector, each composite having multiple vertical slices, wherein each vertical slice is generated for viewing from the perspective of a viewpoint having a defined width; and
projecting each vertical slice to a specified area, wherein the specified area is linearly positioned between each projector and the viewpoint and is sized as a function of the width of the defined viewpoint.

18. A computer-readable medium as recited in claim 17, wherein projecting further comprises projecting full-parallax 3 D display of the image.

* * * * *

UNITED STATES PATENT AND TRADEMARK OFFICE
CERTIFICATE OF CORRECTION

| | | |
|---|---|---|
| PATENT NO. | : 7,425,070 B2 | Page 1 of 1 |
| APPLICATION NO. | : 11/128678 | |
| DATED | : September 16, 2008 | |
| INVENTOR(S) | : Hsu | |

It is certified that error appears in the above-identified patent and that said Letters Patent is hereby corrected as shown below:

In column 6, line 45, in Claim 1, delete "generated multiple composite" and insert -- generating multiple composites --, therefor.

In column 6, line 46, in Claim 1, after "composite is" delete "generating" and insert -- generated --, therefor.

In column 6, line 46, in Claim 1, before "each composite" delete "projectors," and insert -- projector, --, therefor.

In column 6, line 54, in Claim 1, after "diffusion" delete "screen is" and insert -- screen, wherein the diffusion screen is --, therefor.

In column 6, lines 61-62, in Claim 3, after "projection." delete "image in a vertical direction with little or no diffusion in a horizontal direction.".

In column 6, line 64, in Claim 4, delete "3 D" and insert -- 3D --, therefor.

In column 6, line 67, in Claim 5, delete "crating" and insert -- creating --, therefor.

In column 7, line 47, in Claim 11, delete "3 D" and insert -- 3D --, therefor.

In column 8, lines 9-10, in Claim 13, delete "configiuration;" and insert -- configuration; --, therefor.

In column 8, line 49, in Claim 18, delete "3 D" and insert -- 3D --, therefor.

Signed and Sealed this
Nineteenth Day of April, 2011

David J. Kappos
*Director of the United States Patent and Trademark Office*